Aug. 29, 1967     H. W. SPEYER     3,337,892
COMBINED BRUSH AND WARNING DEVICE
Filed March 13, 1964     2 Sheets-Sheet 1
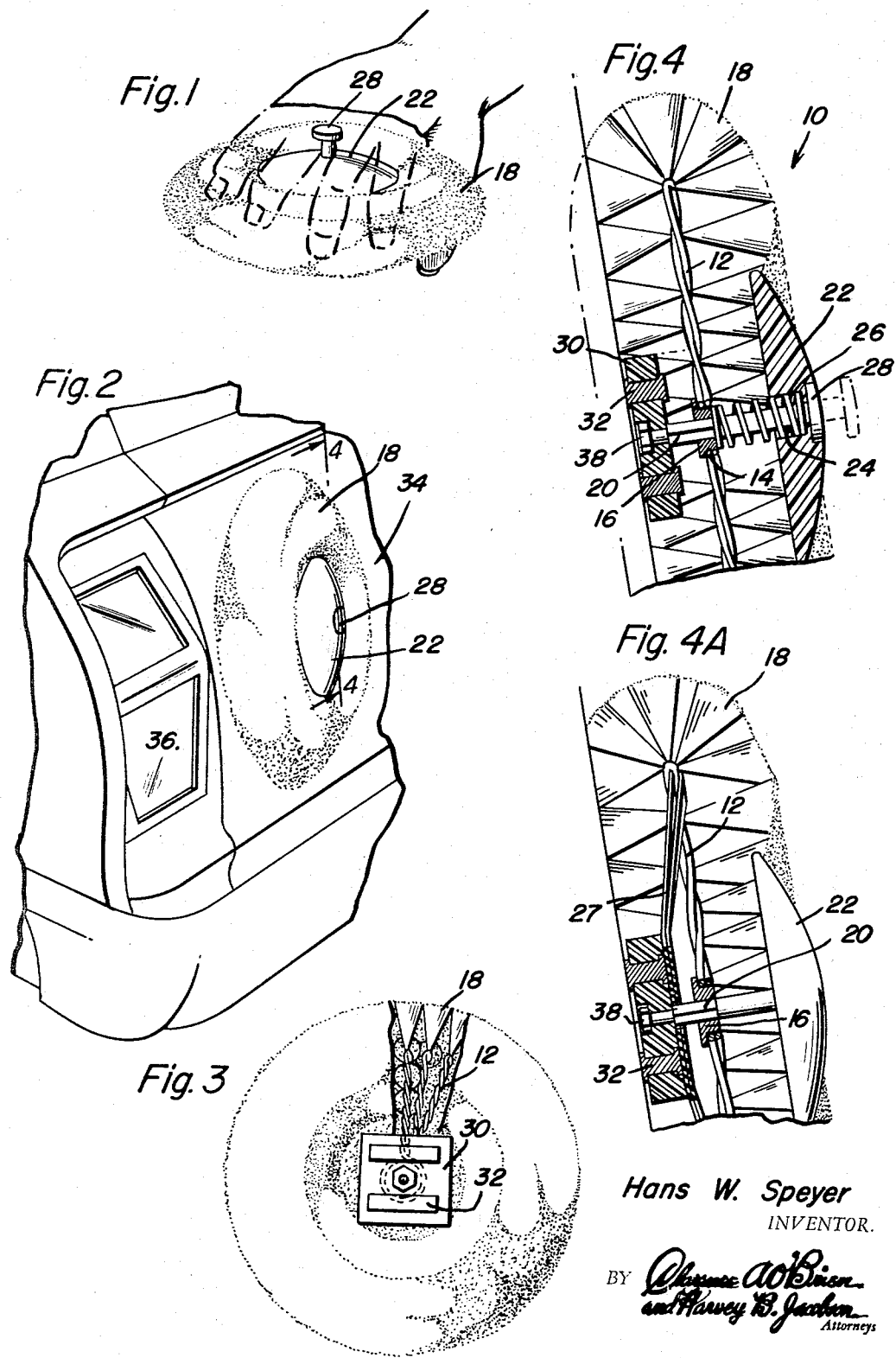
Hans W. Speyer
INVENTOR.
BY *[signatures]*
Attorneys Aug. 29, 1967  H. W. SPEYER  3,337,892
COMBINED BRUSH AND WARNING DEVICE
Filed March 13, 1964
2 Sheets-Sheet 2
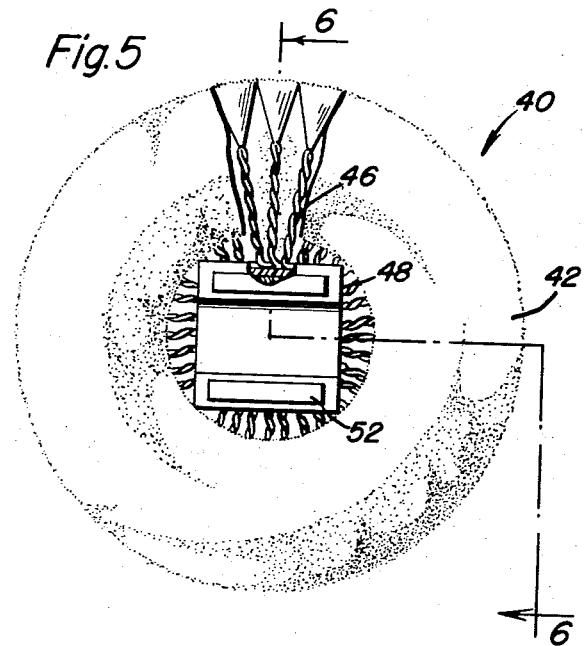
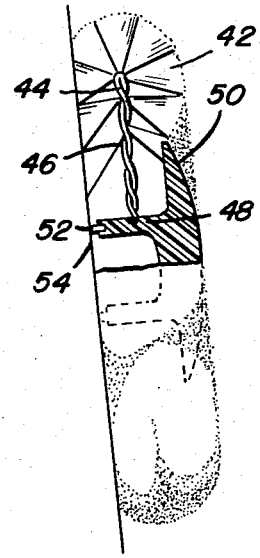
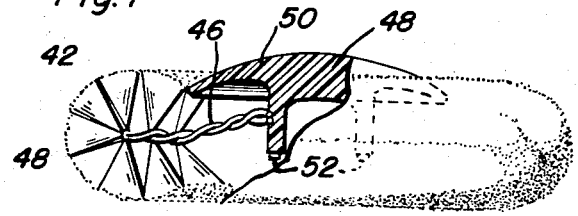
Hans W. Speyer
INVENTOR.
BY *Clarence A. O'Brien*
*and Harvey B. Jacobson*
Attorneys

United States Patent Office 3,337,892
Patented Aug. 29, 1967

3,337,892
COMBINED BRUSH AND WARNING DEVICE
Hans W. Speyer, 2722 Carrollton Ave.,
Indianapolis, Ind. 46205
Filed Mar. 13, 1964, Ser. No. 351,608
4 Claims. (Cl. 15—105)

The present invention generally relates to a structure in the form of a warning device combined with a clothesbrush which structure would be particularly advantageous for carrying in a vehicle whereby the clothesbrush may be used as a brush when desired and also the warning device may be employed by attaching it to the exterior surface of the vehicle alongside of a roadway to warn approaching drivers or others of the existence of such a vehicle and the possible dangers which may be encountered.

Basically, the present invention may be considered a clothesbrush suitable for use in an automobile having a permanent magnet associated therewith which will retain the brush in place in the vehicle. The permanent magnet may be retractable in order to enable the magnet to be moved to an out-of-the-way position when the brush is desired to be used as a clothesbrush. On the back surface of the brush, there is provided reflector means of any desired construction which will act as an emergency warning signal when attached by means of the magnet to the exterior surface of the vehicle or other object which is desired to be made noticeable.

Yet another important feature of the present invention is to provide a warning device which has many utilitarian purposes and yet is quite simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a brush and warning device incorporating the principles of the present invention therein;

FIGURE 2 is a perspective view of the construction of FIGURE 1 illustrating its manner of use with a vehicle;

FIGURE 3 is a bottom plan view of the brush illustrating the orientation of the permanent magnet therein;

FIGURE 4 is a vertical sectional view taken substantially upon a plane passing along section line 4—4 of FIGURE 2;

FIGURE 4A is a view like FIGURE 4 showing a modification;

FIGURE 5 is a bottom plan view of another embodiment of brush with portions of the brush and magnet broken away for illustration purposes;

FIGURE 6 is a detailed sectional view taken substantially upon a plane passing along section line 6—6 of FIGURE 5 illustrating further structural details of this form of the invention; and FIGURE 7 is a sectional view similar to FIGURE 6 but illustrating the magnet structure in retracted positions.

Referring now specifically to FIGURES 1-4 of the drawings, the numeral 10 generally designates one embodiment of the combined brush and reflector of the present invention which includes a wire framework 12 having a plurality of radial arms terminating in a central loop assembly 14 provided with a grommet-type fitting or washer 16. Bristles 18 are attached to the radial wire frame elements 12 in a conventional manner to form a generally circular brush for use as a clothesbrush as illustrated in FIGURE 1 with the bristles being constructed of a suitable material normally employed in brush construction and with the wire frame members 12 also being constructed and with the bristles being twisted in the wire frame in a conventional manner.

Extending through the grommet or washer 16 is a rod or shaft 20 having a reflector disk 22 on the outer end thereof with the reflector disk having a periphery generally coincidental with the inner curved portion of the outer edge of the brush. The underside of the reflector disk 22 is provided with a pocket 24 which receives one end of a coil spring 26 which encloses a portion of the rod or shaft 20 and has one end thereof engaging the grommet or washer 16 and the other end received in the pocket 24 thus resiliently urging the reflector disk 22 away from the wire frame 12. The rod 20 is in the form of a push rod which is slidable in the grommet or washer 16 and which is also slidable in the reflector disk 22 and the rod 20 is provided with an enlarged head or knob 28 for engaging the reflector disk 22 which may be constructed of plastic material with a light reflective coating or constructed of reflective plastic material, fluorescent plastic material, or of metallic material with the periphery of the disk 22 being secured to the bristles of the brush in any conventional manner so that the push rod 20 may be reciprocated in relation thereto by compressing the spring 26. The portion of the rod 20 which slides through the grommet or washer 16 and the corresponding hole through the washer or grommet 16 is polygonal for preventing rotation of the shaft 20.

Mounted on the end of the shaft 20 remote from the head 28 is a plastic body 30 having a pair of permanent magnets 32 incorporated therein by virtue of the plastic 30 being formed around the permanent magnets 32 whereby the magnets 32 will be exposed to engage a metallic surface 34 for magnetically securing the brush in place on a vehicular structure at any desired location such as on the rear panel alongside of the tail light 36 or the like. Normally, the spring 26 retains the magnets 32 in spaced relation to the bottom edge of the brush as illustrated in FIGURE 4 so that when the brush is employed as a brush, the head 28 will project beyond the reflector disk 22 as illustrated in FIGURE 1 and this may conveniently be received between the fingers of the hand of a person using the brush. The plunger rod or shaft 20 then may be depressed by engaging the head 28 in an obvious manner to project the magnet 32 so that they will contact the ferrous metallic surface 34 for retaining the brush in position. Inasmuch as the spring 26 will be partially compressed, there is a tendency for the bristles also to be partially compressed thereby assuring that the warning disk 22 will be retained in position on the rear surface of the vehicle 34 as illustrated in FIGURE 2 which will enable the device to be useful whether the vehicle is setting still or whether the surface is a vertical surface or not or whether the vehicle is moving and subject to road vibrations.

The bristle brush may be circular, oblong, square or any other suitable shape and may be of conventional construction insofar as the steel wire frame is concerned except that the central section of the frame has the grommet or washer 16 incorporated therein. When the brush is to be used as illustrated in FIGURE 1, the magnets 32 which are also exposed to the upper surface of the plastic mounting plate 30 will be attracted to and be disposed against the wire frame 12 which is of steel construction thus retaining the magnet in its retracted position. As illustrated, the plastic supporting plate 30 may be secured to the plunger rod or shaft 20 by any suitable fastening nut 38 or the like.

FIGURE 4A illustrates a modified form of the invention in which the magnets 32 are supported from a transversely extending strap 27 of elastic material such as rubber that is suspended between diametrically opposed points on the wire brush frame or cross bar 12. When the magnet is pressed against a ferrous metallic surface such as a car by exerting pressure on the knob 28 of the stem 20, the elastic material will be stretched or tensioned. This will hold the brush against the surface and prevent movement thereof in the same manner as the structure illustrated in FIGURES 1-4. When the brush is to be used as a brush during a brushing operation, the magnet is retracted by moving the stem through the disk 22 and the disk 22 may either have a ferrous extension to which the magnet is retracted for retaining it in "parked" position or it may be attracted to the ferrous frame or cross-bar 12 of the brush.

It is pointed out that the magnet assembly may be attached to the stem, rod or shaft 20 by crimping, riveting or welding and the magnet may be suspended in the magnet carrier in any suitable manner and this may be flexible plastic or rubber material. The disk 22 may be covered with or impregnated with fluoroscent or radiant material and may also be provided with means for elevation above the rim of the brush shaped in a manner to provide a handle for the use of a brush as the clothesbrush.

In the form of the invention disclosed in FIGS. 1-4, there is a differential action between the pull of the magnets 32 and the push of the spring 26. The spring 26 is only strong enough to withdraw the body 30 which holds the magnet 32 back into the inner brush area so as to avoid interference of the magnets 32 with any material to be brushed. Thus, the spring will retain the magnets in this stored position as long as the magnets are not engaged through contact with a ferrous metallic surface. When the magnets 32 are engaged with a ferrous metallic surface, they are powerful enough to overcome the light tension of the spring thus retaining the brush in position. The magnets will retain this position until manual assistance is afforded the spring in order to overcome the magnetic force and thus making removal of the brush unit possible. Depressing the knob simply reengages the magnets with the ferrous surface while the function of this spring is merely to steady and facilitate the parking of the magnets against the ferrous cross-bar.

FIGURES 5 and 6 illustrate another form of the present invention illustrated by numeral 40 in which the brush construction includes bristles 42 and a steel wire frame 44 substantially similar to that employed in the form of the invention illustrated in FIGURES 1 through 4 except that in this form of the invention, the inner ends of the radial wire frame members 46 are secured to and embedded in a generally rectangular plastic body 48 of inverted U-shaped construction as illustrated in FIGURE 7 with the bight portion of the U-shaped body 48 having a generally dome-shaped reflector disk 50 incorporated therein. The other end of the leg of the U-shaped body 48 has permanent magnets 52 incorporated therein for engaging a metallic supporting surface 54 when the radial arms 46 are substantially perpendicular to the legs of the U-shaped body 48 as illustrated in FIGURE 6. However, the normal attitude of the radial arms 46 is illustrated in FIGURE 7 in which the magnets 52 are spaced away from a supporting surface and are retracted so that the brush may be used in the normal manner for brushing clothes or the like. The reflective disk 50 may be constructed of plastic, rubber or the like having reflective qualities and the magnets 52 may be embedded therein or otherwise secured thereto. Metallic magnets may be employed, ceramic coated magnets or rubber with small permanent magnets incorporated therein generally known as magnetic rubber may be employed for securing the brush in place.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combined brush and warning device comprising a panel of material highly reflective to light, means connected with said panel for securing the panel detachably on a support, said panel being in the form of a reflective disk, a bristle brush of annular configuration partially receiving said disk and movably secured to the said means, said means mounting the reflective disk including a magnet attached thereto and normally retracted above a surface of the brush for enabling the brush to be operated as a brush and being extendible into engagement with a ferrous metallic supporting surface.

2. The structure as defined in claim 1 wherein said brush includes a metallic wire frame, said magnet being movably mounted on said frame, spring means urging said magnet to retracted position whereby the magnet will engage the frame for retaining the magnet in retracted position.

3. The structure as defined in claim 2 wherein said spring means includes an elastic suspension strap extending across the frame, said magnet being mounted on said strap.

4. A combined brush and warning device comprising a panel of material highly reflective to light, means connected with said panel for securing the panel detachably on a support, said panel being in the form of a reflective disk, a brush partially encircling said disk and connected thereto, a plurality of wire arms extending between the disk and brush with the wire arms normally being flexed so that the disk will be spaced from a supporting surface, and magnets on said disk for holding the disk adjacent a metallic surface when the brush is engaged with the surface and the disk forced toward the surface whereby the magnets will retain the disk on the surface without movement due to vibration.

References Cited

UNITED STATES PATENTS

| 1,987,357 | 1/1935 | Bergen et al. | |
| 2,199,996 | 5/1940 | Hobson et al. | 88—80 X |
| 2,268,023 | 12/1941 | Dunn | 248—359 X |
| 2,690,094 | 9/1954 | Becker | 88—81 |
| 3,005,381 | 10/1961 | Reinholdt | 88—80 |
| 3,024,702 | 3/1962 | Reinholdt | 88—80 |
| 3,109,619 | 11/1963 | Krug et al. | 248—206 X |

CHARLES A. WILLMUTH, *Primary Examiner.*

DANIEL BLUM, *Examiner.*